United States Patent [19]
Ciolli

[11] Patent Number: 5,399,129
[45] Date of Patent: Mar. 21, 1995

[54] WRAP SPRING DOWNSHIFT MECHANISM

[76] Inventor: Donald A. Ciolli, 2588 Eaton Rd., University Heights, Ohio 44118

[21] Appl. No.: 72,106

[22] Filed: Jun. 7, 1993

[51] Int. Cl.⁶ .................... F16D 43/21; F16H 5/10
[52] U.S. Cl. .................... 475/301; 192/41 S; 192/81 C
[58] Field of Search .......... 475/301, 318; 192/41 S, 192/81 C, 12 BA, 48.92; 81/475

[56] References Cited

U.S. PATENT DOCUMENTS

| Re. 33,514 | 1/1991 | Ciolli | 192/48.92 |
|---|---|---|---|
| 2,437,517 | 3/1948 | Greenlee | 475/301 X |
| 2,484,185 | 10/1949 | Pepper | 192/41 S |
| 2,510,667 | 6/1950 | Starkey | 192/81 C |
| 2,571,232 | 10/1951 | Gorske | 192/41 S |
| 2,588,187 | 3/1952 | Weiser | 495/301 X |
| 2,951,568 | 9/1960 | Hungerford et al. | 192/12 BA |
| 3,018,673 | 1/1962 | Hitt et al. | 475/301 |
| 4,255,987 | 3/1981 | Ciolli | 475/270 |
| 4,328,871 | 5/1982 | Gluskin | 173/12 |
| 4,364,286 | 12/1982 | Ciolli | 475/270 |
| 4,691,786 | 9/1987 | Fujita et al. | 475/301 X |
| 4,848,433 | 7/1989 | Bresson et al. | 475/301 X |
| 4,869,139 | 9/1989 | Gotman | 81/475 |
| 4,991,473 | 2/1991 | Gotman | 81/475 |

FOREIGN PATENT DOCUMENTS 50255 3/1984 Japan .................... 475/301

Primary Examiner—Dirk Wright
Assistant Examiner—Khoi Q. Ta
Attorney, Agent, or Firm—Willian Brinks Hofer Gilson & Lione

[57] ABSTRACT

A down shift mechanism for incorporation in a device such as an assembly tool includes a wrap spring which locks and releases a planetary gear speed reduction assembly to provide shifts between two drive ratios in response to torque throughput. The wrap spring is received upon a drive drum within a cylindrical housing. The ends of the wrap spring are engaged by a pair of relatively rotationally adjustable and fixable spring engaging lugs which adjust the preload of the wrap spring and thus the torque level at which the spring unwraps and lifts off the drive drum and thus the torque level at which the shift occurs. The wrap spring housing is coupled to the ring gear of the planetary gear assembly. When the torque applied to the wrap spring exceeds the preload, the spring unwraps, unlocking the ring gear and planetary gear assembly and downshifting to the speed reduction determined by the planetary gear assembly. An alternate embodiment of the downshift mechanism is also presented.

22 Claims, 3 Drawing Sheets

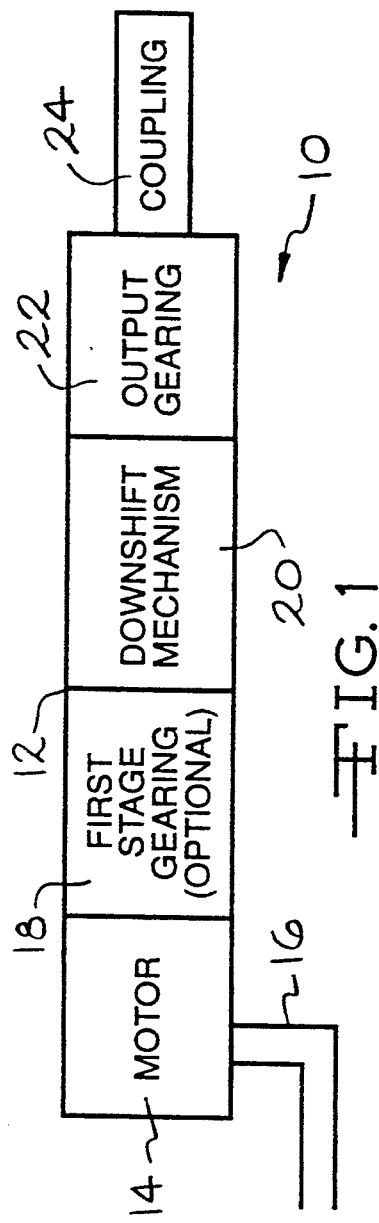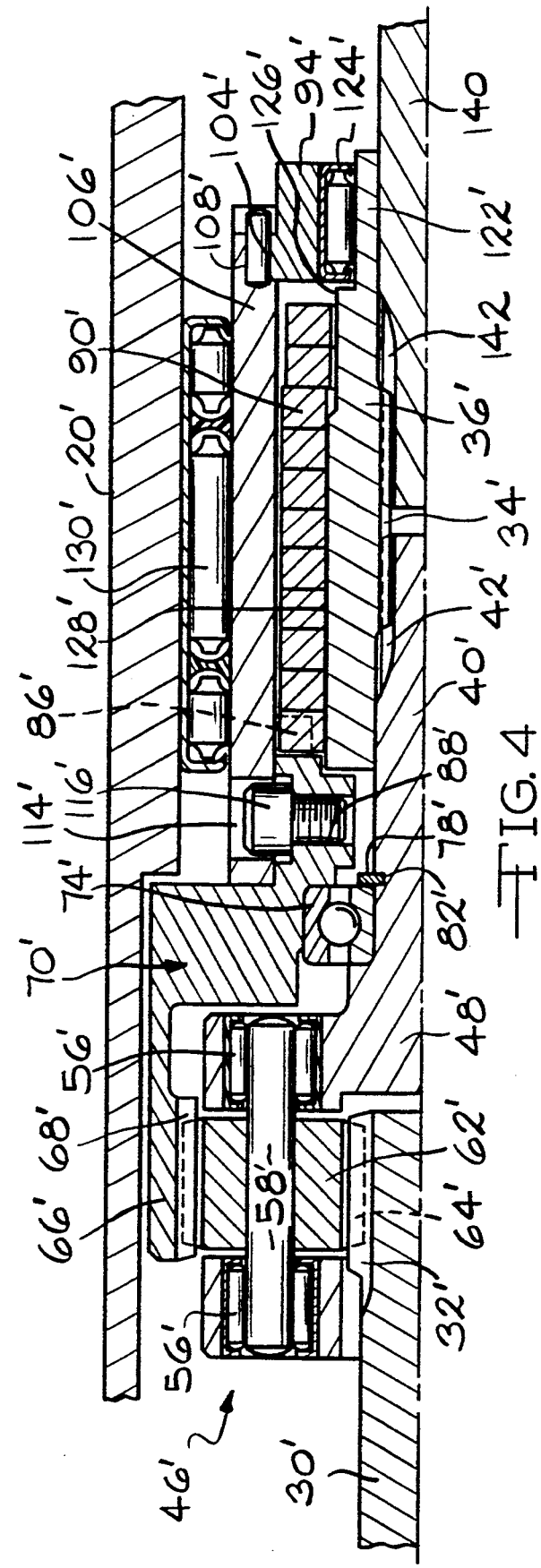

WRAP SPRING DOWNSHIFT MECHANISM

BACKGROUND OF THE INVENTION

The invention relates to an automatic downshift power transmission device and more specifically to an automatic downshift mechanism incorporating a wrap spring and planetary gear speed reduction assembly which automatically shifts between direct drive and reduced speed drive in accordance with the level of torque transmitted through the mechanism.

The majority of power transmission applications require the matching of speed and torque to the load for optimum performance. This results from the almost universal practice of utilizing a mechanical energy source such as an electric, pneumatic or hydraulic motor or internal combustion engine which delivers optimum power and torque over a relatively narrowly defined speed range. Thus, it is likewise nearly universal practice to couple the output of such a device to a mechanism such as a transmission which multiplies torque and reduces speed to match the output of the prime mover to the mechanical task assigned to it. The power train of an automobile comprising an internal combustion engine and an automatic or manual transmission represents a foremost example of this configuration.

The issue of speed and torque matching has also been addressed in connection with drive units for assembly tools. In this application, a fastener such as a nut, bolt, machine screw, self-threading screw or any threaded component will generally require low torque application as it is initially rotated prior to engaging the component or components which it will secure. When the fastener does engage such components, the torque required to rotate it will typically increase. The increased level of torque application is frequently monitored such that the torque ultimately applied to the fastener is appropriate to the application and consistent with the maximum torque the fastener may withstand without thread stripping or other damage, either to itself or the assembled components. A common conundrum of such devices relates to the need for relatively high speed, low torque power application during rundown of the fastener and higher, though carefully controlled, torque application near the end of the cycle to fully tighten the fastener.

I have expended great effort to develop torque control devices which not only limit torque application to a pre-selected level but also have reversible outputs or two speed outputs. For example, my U.S. Pat. No. 4,255,987, which issued Mar. 17, 1981, teaches a compact reversible speed reduction mechanism ideally suited for incorporation into assembly tools. The device includes a pair of juxtaposed epicyclic gear trains mounted in a common carrier which independently engage a pair of ring gears to provide bi-directional output rotation.

A device providing a similar function is disclosed in my U.S. Pat. No. 4,364,286 which issued Dec. 21, 1982. Here, a pair of epicyclic gear trains mounted in a common carrier engage respective ring gears which are locked or released by a respective pair of wrap springs disposed about the cages.

My United States reissue patent No. Re. 33,514 teaches a torque limiting assembly having a pair of coaxially disposed wrap springs; the first spring providing an adjustable torque transmission limit and the second providing a mechanical signal that the torque limit has been reached.

Others have addressed this area of technology as well. For example, U.S. Pat. No. 4,328,871 to Gluskin granted May 11, 1982 teaches an assembly which provides both a high speed/low torque mode for running down a threaded fastener and a low speed/high torque mode for tightening the fastener. The device utilizes two wrap springs: an inner wrap spring which locks and unlocks a planetary gear assembly and an outer wrap spring which is controlled by an actuator to control the gripping or release of the first wrap spring.

U.S. Pat. Nos. 4,869,139 and 4,991,473 of Gotman, the former which issued Sep. 26, 1989 and the latter which issued Feb. 12, 1991, both disclose an automatic speed and torque switching or shifting device. In this device, two different drive trains having distinct torque and speed outputs are driven in parallel by a common motor. Initially, the high speed, low torque output is utilized to drive the fastener. When the level of torque applied to the fastener increases, the coupling to the high speed drive train is disabled and the low speed, high torque output is utilized.

The foregoing discussion suggests not only the desirability of such dual speed/dual torque drive mechanisms which automatically select the appropriate drive speed and torque level output but also reveals the fact that such devices tend to be complicated and may require torque level sensors and auxiliary components to achieve their stated goals. Accordingly, it is apparent that improvements in the art of dual speed and torque delivering mechanisms which automatically shift between such outputs are desirable.

SUMMARY OF THE INVENTION

A downshift mechanism for incorporation in a device such as an assembly tool includes a wrap spring which locks and releases a planetary gear speed reduction assembly to provide shifts between two drive ratios in response to torque throughput. The wrap spring is received upon a drive drum within a cylindrical housing. The ends of the wrap spring are engaged by a pair of relatively rotationally adjustable and fixable spring engaging lugs which adjust the preload of the wrap spring and thus the torque level at which the spring unwraps and lifts off the drive drum and thus the torque level at which the shift occurs. The wrap spring housing is coupled to the ring gear of the planetary gear assembly. When the torque applied to the wrap spring exceeds the preload, the spring unwraps, unlocking the ring gear and planetary gear assembly and downshifting to the speed reduction determined by the planetary gear assembly. Speed reduction ratios may vary widely from about 3.4 to 1 to 10.5 to 1. Preferred and alternate embodiments of the downshift mechanism are presented. The mechanism of the present invention provides highly accurate and repeatable shifts over an extended service life.

Thus it is an object of the present invention to provide a downshift mechanism which automatically selects between a first direct output and a reduced speed, increased torque output.

It is a further object of the present invention to provide an automatic downshift mechanism suitable for use in assembly tools.

It is a still further object of the present invention to provide an automatic downshift mechanism wherein the torque application threshold resulting in a downshift is adjustable.

It is a still further object of the present invention to provide an automatic downshift mechanism which utilizes a single wrap spring and at least one planetary gear assembly.

It is a still further object of the present invention to provide an automatic downshift mechanism having both high repeatability and extended service life.

It is a still further object of the present invention to provide an automatic downshift mechanism which is readily adapted to a broad range of assembly tools and other applications utilizing or requiring an automatic downshift power transmission mechanism.

Still further objects and advantages of the present invention will become apparent by reference to the following descriptions of the preferred and alternate embodiments and appended drawings.

BRIEF DESCRIPTION OF THE DRAWINGS

FIG. 1 is a schematic view of a power assembly tool incorporating an automatic downshift mechanism of the present invention;

FIG. 4 is a half, sectional view of an alternate embodiment of an automatic downshift mechanism according to the present invention.

DESCRIPTION OF THE PREFERRED AND ALTERNATE EMBODIMENTS

Figure 2:
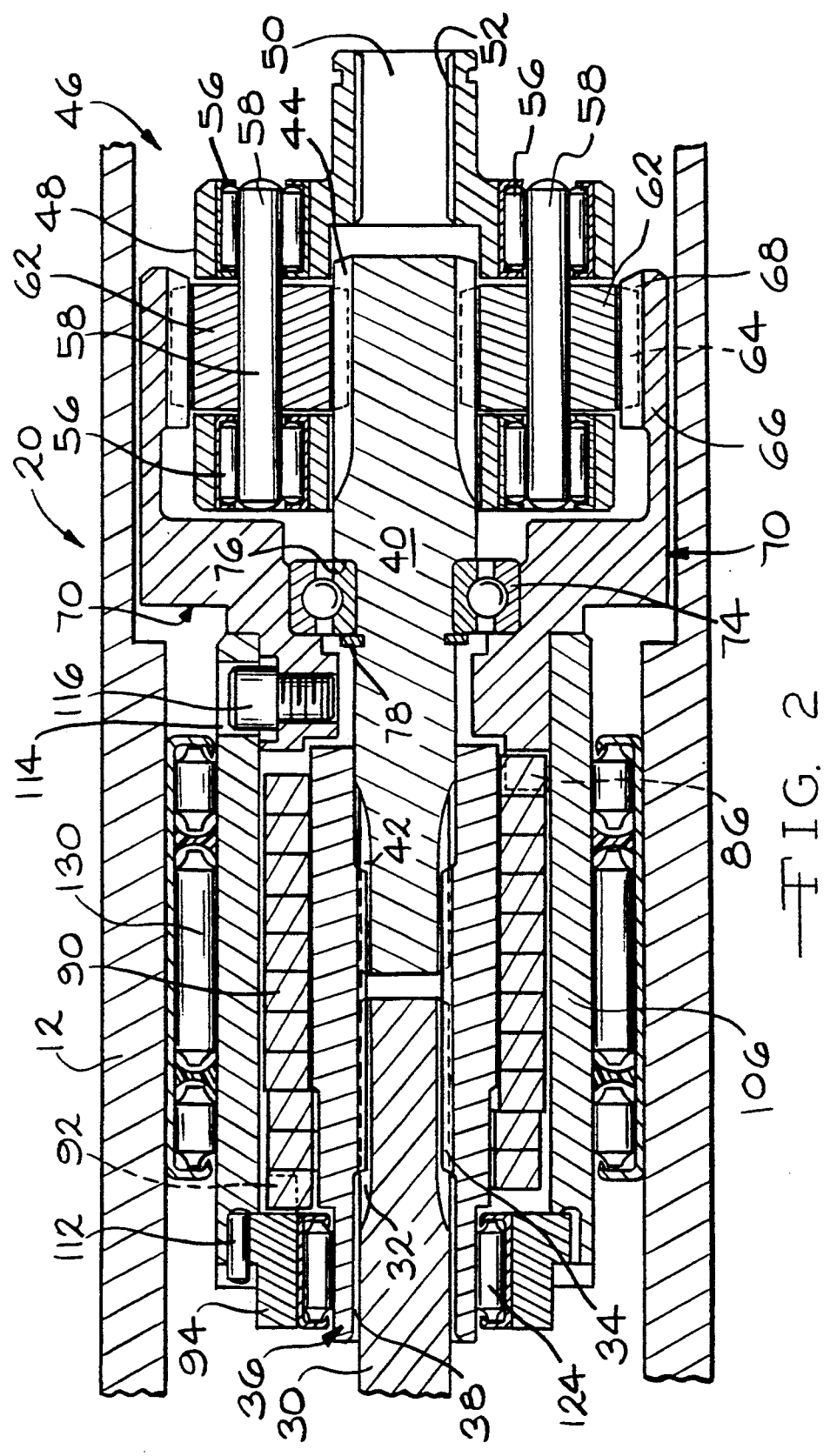
FIG. 2 is a full, sectional view of the preferred embodiment of an automatic downshift mechanism according to the present invention.

Referring now to FIG. 1, an assembly tool which incorporates the present invention and which is exemplary and illustrative of a broad class of assembly tools is illustrated and generally designated by the reference numeral 10. The assembly tool 10 includes a housing 12 containing a prime mover such as an electric, pneumatic or hydraulically powered motor 14 which is supplied with energy through a line 16. The rotating mechanical output of the motor 14 may be provided to a first stage fixed ratio speed reduction gearing 18 which, as noted in FIG. 1, is optional. If the first stage gearing 18 is included in the assembly tool 10, its output is provided to downshift mechanism 20 according to the present invention. If the first stage gearing 18 is not present in the assembly tool 10, the rotating mechanical output of the motor 14 is provided directly to the downshift mechanism 20.

In turn, the mechanical output of the downshift mechanism 20 is provided to a final stage of fixed ratio speed reducing gearing 22 which rotatably drives an output coupling 24 which may be a screw driver blade, a hexagonal drive such as an Allen wrench, a socket or any other coupling designed to engage a complementarily configured head of a fastener.

Figure 3:
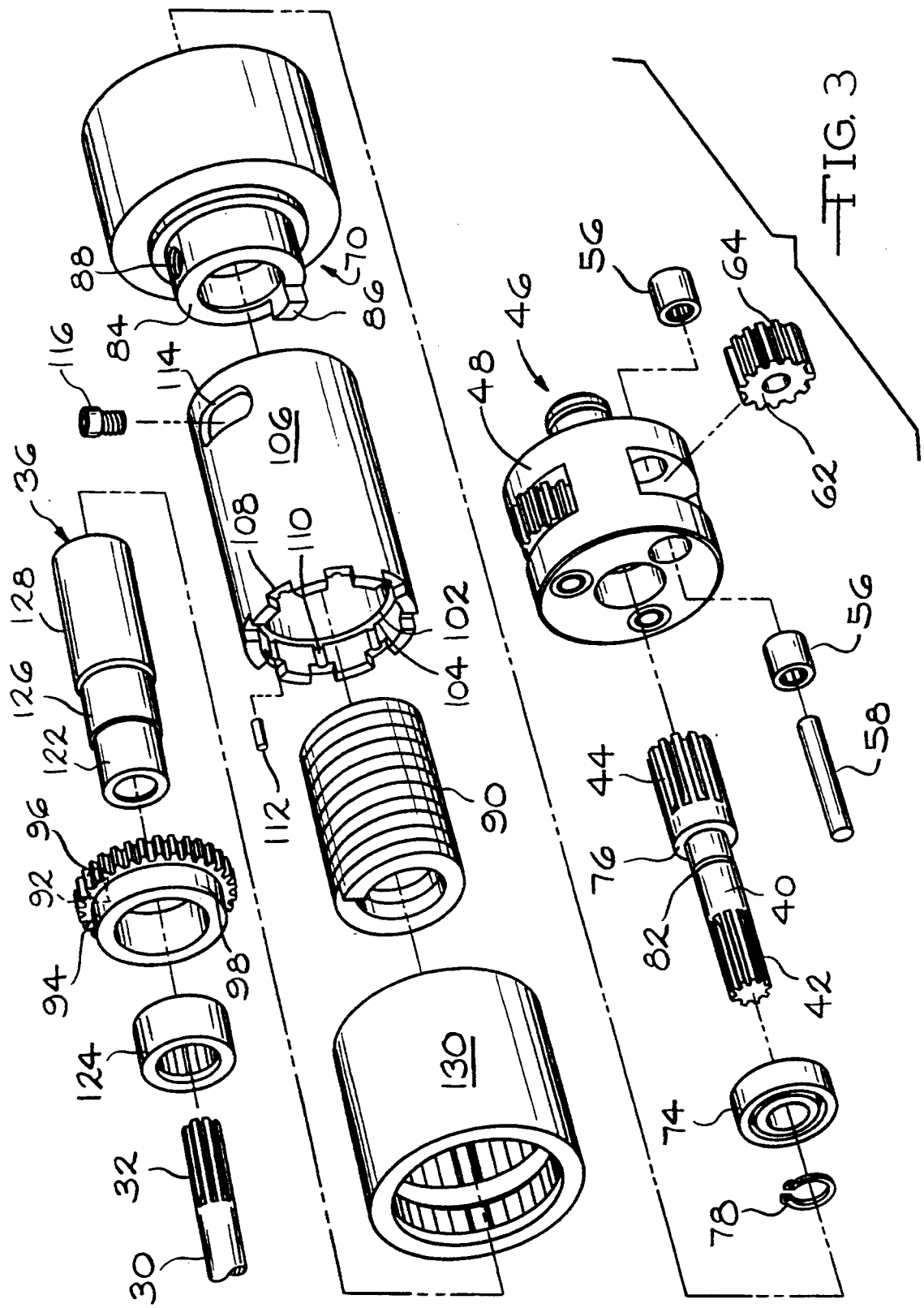
FIG. 3 is an exploded, perspective view of the preferred embodiment of an automatic downshift mechanism according to the present invention.

Referring now to FIGS. 2 and 3, a wrap spring downshift mechanism 20 according to the present invention is disposed in the housing 12 and includes an input shaft 30 having male splines 32 adjacent its terminal portion disposed within the downshift mechanism 20. The input shaft 30 receives power from either the motor 14 or the first stage gearing 18, as noted above. The male splines 32 engage and are received within complementarily configured female splines 34 disposed on the inner surface of a cylindrical spring drive drum 36 which defines a through aperture 38. Engagement of the male splines 32 with the female splines 34 rotationally couples the input shaft 30 to the spring drive drum 36 as will be readily appreciated. Disposed in aligned, adjacent relationship with the input shaft 30 is a pinion shaft 40 having a set of male splines 42 which are complementary to the female splines 34 on the inner surface of the spring drive drum 36. The male splines 42 engage and are received within the female splines 34. By virtue of the engagement of the male splines 42 with the female splines 34, the pinion shaft 40, the spring drive drum 36 and the input shaft 30 all rotate together.

Adjacent the terminal portion of the pinion shaft 40 opposite the male splines 42 are sun gear teeth 44. The sun gear teeth 44 function as the drive to a planetary gear assembly 46. The planetary gear assembly 46 also includes a carrier assembly 48 having an aperture 50 which defines a plurality of female splines 52 disposed on the inner surface thereof. The carrier assembly 48 functions as the output member of the downshift mechanism 20 and may receive a complementarily configured splined shaft (not illustrated) which provides the rotating output of the downshift mechanism 20 to the output gearing 22 illustrated in FIG. 1. Disposed within the carrier assembly 48 are a plurality of roller bearing assemblies 56 which rotatably support stub shafts 58. The roller bearing assemblies are preferably disposed in equal 120° intervals about the axis of the carrier assembly 48. Generally centrally disposed upon the stub shafts 58 are an equal number of planet gears 62. The planet gears 62 include peripheral gear teeth 64 which are complementary to and engage the sun gear teeth 44 on the pinion shaft 40. A ring gear 66 having gear teeth 68 complementary to the gear teeth 64 on the planet gears 62 is aligned with, surrounds and is in constant mesh with the plurality of planet gears 62.

The ring gear 66 forms a portion of a ring assembly 70 which is disposed coaxially and concentrically about the pinion shaft 40. An anti-friction bearing such as a ball bearing assembly 74 rotatably supports the ring assembly 70 on the pinion shaft 40. The ball bearing assembly 74 is maintained in position against a shoulder 76 of the pinion shaft 40 by a snap ring 78 which is received within a complementarily configured groove 82 in the pinion shaft 40. The ring assembly 70 also includes a reduced diameter neck region 84 having an axially extending spring engaging ear or lug 86 and a radially disposed threaded aperture 88.

Concentrically disposed about the spring drive drum 36 is a wrap spring 90. The wrap spring 90 is of right-hand sense and preferably comprehends ten and one-half turns. One end of the wrap spring is engaged by the spring engaging ear or lug 86 extending from the reduced diameter portion 84 of the ring assembly 70. The other end of the wrap spring 90 is engaged by a complementarily disposed spring engaging ear or lug 92 extending from a gear collar 94. The gear collar 94 includes a plurality, preferably thirty-three, gear teeth 96 disposed about a portion of its periphery. An axially adjacent portion of the collar 94 defines a reduced diameter region 98. The periphery of the gear collar 94 defined by the gear teeth 96 is a sliding fit within an enlarged diameter region having a shoulder 102 formed in one end of a cylindrical spring drum 106.

The end of the cylindrical spring drum 106 having the enlarged diameter region defining the shoulder 102 is castellated and includes a plurality of, preferably eight, notches 108. Centrally circumferentially disposed within each of the notches 108 are a like number of semi-circular, equally spaced apart, axially aligned channels 110. The semi-circular channels 110 cooperate with the spaces between the gear teeth 96 of the gear collar 94 to receive a single register pin 112. Selection of one of the semi-circular channels 110 and alignment therewith with one of the spaces between the gear teeth 96, given the use of a gear collar 94 with thirty-three teeth and eight semi-circular channels 110 in the spring drum 106, permits selection and fixing of two hundred sixty-four unique positions of relative rotation, i.e., angular definition of 1.36°, between the gear collar 94 and the cylindrical spring drum 106.

At the end of the cylindrical spring drum 106 opposite the notches 108 is an elongate slot 114. The slot 114 receives the head of a threaded set screw 116 which is securely seated in the complementarily threaded aperture 88 in the neck region 84 of the ring assembly 70.

The gear collar 94 is supported for rotation upon a first, smallest diameter terminal portion 122 of the spring drive drum 36 by an anti-friction bearing such as a roller bearing assembly 124 and, in turn, supports the cylindrical spring drum 106. The spring drive drum 36 also includes a second, central portion 126 of an intermediate diameter and a third portion 128 of a largest diameter which occupies approximately one-half the length of the spring drive drum 36. The diameter of the second, central portion 126 of the spring drive drum 36 is preferably slightly smaller than the inside diameter of the wrap spring 90 in a relaxed state and the diameter of the third portion 128 of the spring drive drum 36 is greater than the inside diameter of the wrap spring 90 in a relaxed state. The extent to which the wrap spring 90 must be enlarged (unwound) to fit upon the third portion 128 of the spring drive drum 36, i.e., the degree of interference fit, and thus the torque preloaded into the wrap spring 90, is equal to the level of torque which must be applied to unwind the wrap spring 90, causing it to slip upon the drive drum 36. Lesser torque levels will result in no slippage and thus complete torque transfer; greater levels will lift the wrap spring off the drive drum 36 and completely inhibit torque transfer.

The cylindrical spring drum 106 has an inside diameter slightly larger than the outside diameter of the wrap spring 90 when it is disposed upon the third portion 128 of the drive drum 36. Positioned concentrically about the exterior surface of the cylindrical spring drum 106 is a one-way or overrunning brake assembly 130 commonly referred to as a one-way or overrunning clutch assembly. The overrunning clutch assembly 130 permits rotation of the cylindrical spring drum 106 in a clockwise direction as viewed from the left in FIG. 2 but resists motion and locks the cylindrical spring drum 106 to the housing 12 to prevent rotation thereof in a counterclockwise direction.

To utilize the wrap spring downshift mechanism 20 of the present invention, it is necessary to select and adjust the mechanism 20 to shift at the desired level of torque throughput. This is achieved by preloading the wrap spring 90 by adjusting and fixing the relative positions of the ends of the wrap spring 90 by adjusting and fixing the rotational position of the ear or lug 92 on the gear collar 94 relative to the ear or lug 86 on the ring assembly 70. As noted previously, the combination of eight possible locations of the register pin 112 with the thirty-three gear teeth 96 on the ring collar provides two hundred sixty-four unique relative positions of the ends of the wrap spring 90.

It should be appreciated that a spring such as the wrap spring 90 will transmit torque from a drive member such as the spring drive drum 36 in a direction which tends to unwind the wrap spring 90 only until transmitted torque is equal to the preload torque induced in the spring 90 due to the interference fit with the drive drum 36. Since the preload of the wrap spring 90 due to the interference fit with the drive drum 36 is determined solely by such inference and is thus fixed for a given wrap spring/drum combination, in order to achieve adjustability of the maximum torque throughput and thus the point at which downshift occurs, it is necessary to include turns of the wrap spring 90 which may be adjustably preloaded. These turns are the approximately two and one-half turns of the ten and one-half turn wrap spring 90 which are received over the central, intermediate diameter portion 126 of the drive drum 36. As noted, the ends of the wrap spring 90 may be rotated relative to one another by adjustment of the gear collar 94 within the cylindrical spring drum 106 and the register pin 112 inserted in the space between two adjacent teeth into an aligned semi-circular channel 110. Preload of the portion of the wrap spring 90 adjacent the intermediate region 126 of the drive drum 36 subtracts from the preload in the remainder of the wrap spring 90 induced by the interference fit with the largest diameter portion 128 of the drive drum 36. Typically, the preload torque of the wrap spring 90 is adjusted to a level suitably lower than the stall torque of the drive motor 14 such that the wrap spring 90 will slip on the drive drum 36 and a downshift will occur before the drive motor 14 stalls.

Operation of the automatic downshift mechanism 20 occurs as follows. Normal rotation of the input shaft 30 is clockwise as viewed from the left end of such shaft in either FIG. 2 or FIG. 3. Torque is thus applied to the wrap spring 90 in a direction which tends to unwind it. Initially and at low torque levels, the wrap spring 90 couples the input shaft 30 which is also connected to the sun gear 44 to the ring assembly 70, thereby locking the planetary gear assembly 46. It will be appreciated that a portion of the torque passing through the downshift mechanism 20 is applied directly to the sun gear teeth 44 while the remainder is transmitted through the wrap spring 90.

As the torque level passing through the automatic downshift mechanism 20 increases to the level at which it is equal to the interference preload of the wrap spring 90 less the preselected preload, the wrap spring 90 will begin to slip and the planetary gear assembly 46 will begin to downshift. With the slightest further increase in transmitted torque, the wrap spring 90 will lift completely off the spring drive drum 36 thereby fully unlocking the input shaft 30 and the sun gear 44 from the ring assembly 70.

Reaction torque at such transition torque levels is transmitted counterclockwise from the ring assembly 70 through the wrap spring 90 by means of the lugs 86 and 92 to the spring drum 106. As this reaction torque increases, the diameter of the wrap spring 90 will continue to expand until it contacts the inside surface of the spring drum 106. The wrap spring 90 then locks to the spring drum 106, allowing significant further torque increases to be reacted against the one-way clutch 130. The set screw 116 cooperates with the elongate slot 114 and functions as a safety stop to limit relative rotation between the spring drum 106 and the ring assembly 70 and thus relative rotation between the ends of the wrap spring 90 in one direction. In the opposite direction of relative rotation, such cooperation limits travel and acts as a stop against which the preselected preload of the wrap spring 90 is reacted.

When the fastening cycle is complete or when the torque throughput drops below the level necessary to maintain the wrap spring out of contact with the spring drive drum 36, the wrap spring 90 once again engages the surface of the drive drum 36 and locks the elements of the planetary gear assembly 46 together, thereby returning to a direct drive state.

Referring now to FIG. 4, a first alternate embodiment of an automatic downshift mechanism 20' is illustrated. The alternate embodiment automatic downshift mechanism 20' generally includes the components of the preferred embodiment downshift mechanism 20 but such components are arranged in what may be generally characterized as a mirror image of those components in the preferred embodiment downshift mechanism 20. Thus, the alternate embodiment downshift mechanism 20' includes an input shaft 30' having gear teeth 32' which function as a sun gear in a planetary gear assembly 46'. The planetary gear assembly 46' includes a carrier 48' which receives a plurality of anti-friction bearings such as the roller bearing assemblies 56' which support a plurality of stub shafts 58'. The stub shafts 58', in turn, rotatably support a like plurality of planet gears 62' having gear teeth 64'. The gear teeth 64' engage a ring gear 66' having complementarily configured gear teeth 68' on its inner surface. The ring gear 66' forms a portion of a ring gear assembly 70' which is rotatably supported by a ball bearing assembly 74' upon a shaft portion 40' of the carrier 48'. The ball bearing assembly 74' is retained upon the shaft portion 40' by cooperation between a groove 82' and snap ring 78' seated therein. The shaft portion 40' includes a plurality of male splines 42' which rotatably engage a complementarily configured set of female splines 34' on the inner surface of a spring drive drum 36'.

An output shaft 140 includes a plurality of splines 142 which are complementary to the female splines 34' and are like the male splines 42' on the shaft 40'. The spring drive drum 36' includes three regions of distinct diameters, a first, smallest region 122' receiving and supporting an anti-friction bearing such as a roller bearing assembly 124'. A second, intermediate region having a diameter preferably smaller than the relaxed inside diameter of the wrap spring 90' receives a portion of the wrap spring 90'. A third region of the spring drive drum 36 defines the greatest axial length thereof and further defines an outside diameter larger than the inside diameter of the relaxed wrap spring 90'.

The ring assembly 70 includes an ear or lug 86' which engages one end of the wrap spring 90' as well as a threaded aperture 88' which receives a set screw 116'. Disposed about the wrap spring 90' is a cylindrical spring drum 106' having a circumferentially elongate slot 114' which receives the head of the set screw 116'. At the opposite end of the spring drum 106 are a plurality of castellations or notches 108', a enlarged diameter region 102' and a shoulder 104' which receives a gear collar 94'. Adjustment of the preload of the wrap spring 90' is achieved in the identical manner described above with regard to the preferred embodiment. An overrunning clutch 130' surrounds and supports the spring drum 106' permitting rotation thereof in only the clockwise direction.

While the components of the alternate embodiment wrap spring downshift mechanism 20' are configured in a generally mirror image arrangement relative to the preferred embodiment mechanism 20, the operation thereof is distinct. One significant difference is that in the direct drive mode, the wrap spring 90' locks the carrier 48' and its associated shaft portion 40' to the ring assembly 70' rather than locking the sun gear 44 to the ring assembly 70 as in the preferred embodiment. In both cases, however, when the planetary gear assemblies 46 and 46' are locked, direct drive through the downshift mechanisms 20 and 20' is achieved.

As torque throughput through the downshift mechanism 20' increases, and the threshold of slip due to torque throughput is achieved by virtue of equaling the preload due to the interference of the wrap spring 90' on the largest diameter region 128' of the spring drive drum 36' minus the adjusted preload achieved by the turns adjacent the intermediate portion 126' of the spring drive drum 36' the wrap spring 90' begins to unlock the carrier 48' from the ring assembly 70'. Any slight increase in torque throughput will lift the wrap spring 90' completely off the spring drive drum 36' thereby fully releasing the ring assembly 70' from the shaft 40' of the carrier 48' and effecting a downshift by enabling operation of the planetary gear assembly 46'.

Depending upon the relative sizes of the sun gears 44 or 32', the planet gears 56 and 56' and the ring gears 66 and 66', the speed reduction ration of the planetary gear assemblies 46 or 46' may be in the range of from 3.4 to 1 or less to 10.5 to 1 or more, if an application demands it. In an assembly tool, torque capability and shift points in the range of 16 to 285 Newton-meters has been readily achieved.

While the foregoing embodiments 20 and 20' of an automatic downshift mechanism have been described within the context and application parameters of an assembly tool, it should be appreciated that the mechanism will have broad application in devices and power trains requiring torque and speed matching to a load and automatic shifting between a first high speed, low torque output and a second, lower speed, higher torque output.

The foregoing disclosure is the best mode devised by the inventor for practicing this invention. It is apparent, however, that devices incorporating modifications and variations will be obvious to one skilled in the art of power transmission devices. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A wrap spring shift mechanism comprising, in combination,
   an input member,
   an output member,
   a planetary gear speed reduction assembly having a ring gear housing, a carrier coupled to said output member, at least one planet gear rotatably disposed in said carrier and a sun gear disposed in engagement with said planet gear, and
   a wrap spring assembly having a drive drum, a wrap spring disposed in frictional contact about said drive drum, a driven drum disposed about said wrap spring and operably coupled to said ring gear housing and said wrap spring.

2. The wrap spring shift mechanism of claim 1 wherein said drive drum defines two external cylindrical surfaces having distinct diameters.

3. The wrap spring shift mechanism of claim 1 wherein said drive drum defines first and second regions having distinct outside diameters, the diameter of said first of said regions being larger than the inside diameter of said wrap spring in a relaxed state and the diameter of said second of said regions being smaller than the inside diameter of said wrap spring in said relaxed state.

4. The wrap spring shift mechanism of claim 1 wherein said wrap spring includes a pair of ends and further including means for adjusting the position of one of said ends of said wrap spring relative to another of said ends of said wrap spring.

5. The wrap spring shift mechanism of claim 1 wherein said driven drum includes a plurality of axially extending pin receiving openings and further including a pin, a collar having a plurality of teeth disposed thereabout and means for engaging said wrap spring.

6. The wrap spring shift mechanism of claim 1 wherein said input member is coupled to said drive drum.

7. The wrap spring shift mechanism of claim 1 wherein said input member is coupled to said sun gear of said planetary gear assembly.

8. The wrap spring shift mechanism of claim 1 further including a housing and a one-way brake disposed between said driven drum and said housing.

9. The wrap spring shift mechanism of claim 1 wherein said wrap spring is of right-hand sense and includes at least ten turns.

10. The wrap spring shift mechanism of claim 1 further including coupling means for providing limited relative rotation between said ring gear housing and said driven drum.

11. A wrap spring shift mechanism comprising, in combination,
an input member,
an output member,
a planetary gear speed reduction assembly having a ring gear housing, a carrier coupled to said output member, at least one planet gear rotatably disposed in said carrier and a sun gear disposed in engagement with said planet gear,
a wrap spring assembly having a drive drum operably coupled to said input member, a wrap spring disposed in frictional contact about said drive drum, a driven drum disposed about said wrap spring and operably coupled to said ring gear housing and said wrap spring.

12. The wrap spring shift mechanism of claim 11 wherein said drive drum defines first and second regions having distinct outside diameters, the diameter of said first of said regions being larger than the inside diameter of said wrap spring in a relaxed state and the diameter of said second of said regions being smaller than the inside diameter of said wrap spring in said relaxed state.

13. The wrap spring shift mechanism of claim 11 wherein said wrap spring includes a pair of ends and further including means for adjusting the relative position of one of said ends of said wrap spring relative to another of said ends of said wrap spring.

14. The wrap spring shift mechanism of claim 11 further including a housing and a one-way brake disposed between said driven drum and said housing.

15. A wrap spring shift mechanism comprising, in combination,
an input member,
an output member,
a planetary gear speed reduction assembly having a ring gear housing, a carrier coupled to said output member, at least one planet gear rotatably disposed in said carrier and a sun gear driven by said input member and disposed in engagement with said planet gear, and
a wrap spring assembly having a drive drum coupled to said output member, a wrap spring disposed in frictional contact about said drive drum, a driven drum disposed about said wrap spring and operably coupled to said ring gear housing and said wrap spring.

16. The wrap spring shift mechanism of claim 15 wherein said drive drum defines first and second regions having distinct outside diameters, the diameter of said first of said regions being larger than the inside diameter of said wrap spring in a relaxed state and the diameter of said second of said regions being smaller than the inside diameter of said wrap spring in said relaxed state.

17. The wrap spring shift mechanism of claim 15 wherein said wrap spring includes a pair of ends and further including means for adjusting the relative position of one of said ends of said wrap spring relative to another of said ends of said wrap spring.

18. The wrap spring shift mechanism of claim 15 wherein said driven drum includes a plurality of axially extending pin receiving openings and further including a collar having a plurality of teeth disposed thereabout, a pin for disposition between two of said teeth and in one of said pin receiving opening and means for engaging said wrap spring.

19. The wrap spring shift mechanism of claim 15 further including a housing and a one-way brake disposed between said driven drum and said housing.

20. An assembly tool wrap spring shift mechanism comprising, in combination,
a housing,
a wrap spring assembly having an input coupled to a drive drum, a wrap spring disposed about said drive drum, a driven drum disposed about said wrap spring and operably coupled to said wrap spring,
a planetary gear speed reduction assembly having a ring gear housing operably coupled to said driven drum, a carrier providing an output, at least one planet gear rotatably disposed in said carrier and a sun gear operably coupled to said input and disposed in engagement with said planet gear, and
a one-way brake disposed about said driven drum and within said housing.

21. The assembly tool shift mechanism of claim 20 wherein said drive drum defines first and second regions having distinct outside diameters, the diameter of said first of said regions being larger than the inside diameter of said wrap spring in a relaxed state and the diameter of said second of said regions being smaller than the inside diameter of said wrap spring in said relaxed state.

22. The assembly tool shift mechanism of claim 20 wherein said wrap spring includes a pair of ends and further including means for adjusting the position of one of said ends of said wrap spring relative to another of said ends of said wrap spring.

* * * * *